US 9,048,756 B2

(12) United States Patent
Dong et al.

(10) Patent No.: US 9,048,756 B2
(45) Date of Patent: Jun. 2, 2015

(54) DC-SIDE LEAKAGE CURRENT REDUCTION FOR SINGLE PHASE FULL-BRIDGE POWER CONVERTER/INVERTER

(75) Inventors: Dong Dong, Blacksburg, VA (US); Fang Luo, Blacksburg, VA (US); Dushan Boroyevich, Blacksburg, VA (US); Paolo Mattavelli, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 359 days.

(21) Appl. No.: 13/415,141

(22) Filed: Mar. 8, 2012

(65) Prior Publication Data

US 2013/0235628 A1    Sep. 12, 2013

Related U.S. Application Data

(60) Provisional application No. 61/607,666, filed on Mar. 7, 2012.

(51) Int. Cl.
*H02M 1/14* (2006.01)
*H02M 7/797* (2006.01)
*H02M 1/12* (2006.01)

(52) U.S. Cl.
CPC ........ *H02M 7/797* (2013.01); *H02M 2001/123* (2013.01); *Y02E 10/56* (2013.01)

(58) Field of Classification Search
CPC ... H02M 2001/123; H02M 1/12; H02M 1/14; H02M 1/15; H02M 7/66; H02M 7/68; H02M 7/79; H02M 7/797
USPC .......... 323/207; 363/44, 47, 46, 71, 131, 127, 363/132
See application file for complete search history.

(56) References Cited

U.S. PATENT DOCUMENTS 4,935,861 A * 6/1990 Johnson et al. ............... 363/132
5,499,178 A * 3/1996 Mohan ............................ 363/39
(Continued)

FOREIGN PATENT DOCUMENTS

WO    WO2010055713    * 5/2010
WO    WO2011087045    * 7/2011

OTHER PUBLICATIONS

Huafeng Xiao, Student Member, IEEE, Shaojun Xie, Member, IEEE, Yang Chen, and Ruhai Huang; An Optimized Transformerless Photovoltaic Grid-Connected Inverter; IEEE Transactions on Industrial Electronics, vol. 58, No. 5, May 2011; pp. 1887-1895.*
(Continued)

*Primary Examiner* — Timothy J Dole
*Assistant Examiner* — Shahzeb K Ahmad
(74) *Attorney, Agent, or Firm* — Whitham Curtis Christofferson & Cook, PC

(57) ABSTRACT

Leakage current through stray or parasitic capacitance (which is particularly large in devices such as photovoltaic cell arrays and which are damaged by such leakage currents) due to common mode switching noise in a full bridge single phase power converter is reduced at high frequencies by magnetically coupling the two phase legs on the AC side of the power converter and connecting mid points of the AC and DC sides of the power converter and is reduced at low frequencies by use of a feedback arrangement that modifies sinusoidal modulation of the switches of the full bridge converter to function as an active filter. The magnetic coupling for the two phase legs is designed in a simple manner to avoid saturation based on volt-second considerations.

17 Claims, 13 Drawing Sheets

(56) References Cited

U.S. PATENT DOCUMENTS

| | | | |
|---|---|---|---|
| 5,982,645 A * | 11/1999 | Levran et al. | 363/37 |
| 8,466,662 B2 * | 6/2013 | Nania et al. | 323/207 |
| 8,472,215 B2 * | 6/2013 | Koyama et al. | 363/40 |
| 8,503,208 B2 * | 8/2013 | Krause | 363/127 |
| 2009/0244937 A1 * | 10/2009 | Liu | 363/46 |
| 2011/0089693 A1 * | 4/2011 | Nasiri | 290/44 |
| 2011/0096577 A1 * | 4/2011 | Yamada | 363/44 |
| 2011/0216568 A1 * | 9/2011 | Koyama et al. | 363/132 |
| 2012/0112547 A1 * | 5/2012 | Ghosh et al. | 307/66 |
| 2013/0016543 A1 * | 1/2013 | Ku et al. | 363/71 |
| 2013/0176753 A1 * | 7/2013 | Swamy | 363/37 |

OTHER PUBLICATIONS

Jiri Lettl, Jan Bauer and Libor Linhart Comparison of Different Filter Types for Grid Connected Inverter Mar. 20-23, 2011 Czech Technical University in Praguq, Technicka 2, 166 27 Prague 6, Czech Republic ; PIERS Proceedings, Marrakesh, Morocco.*

* cited by examiner

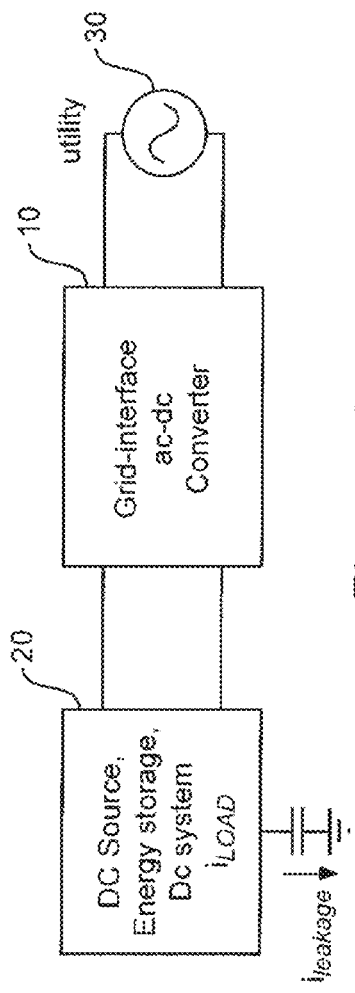
*Figure 1A*
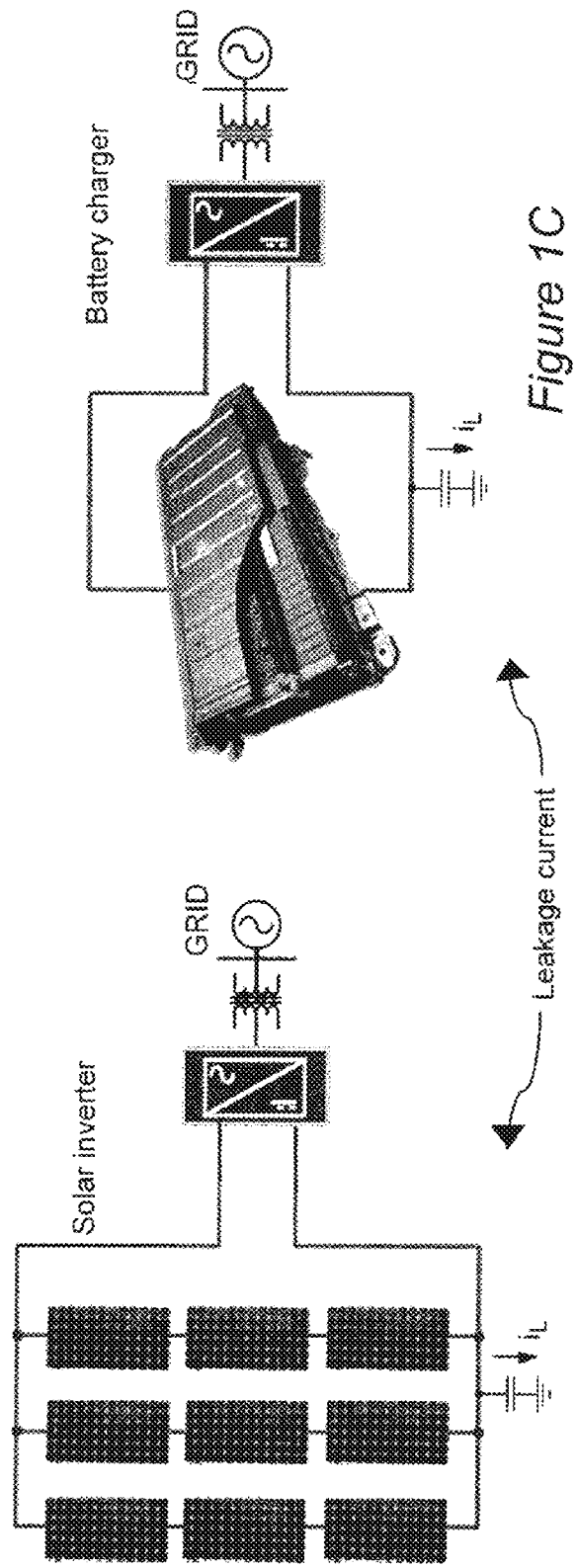
*Figure 1B*
*Figure 1C*

DC-SIDE LEAKAGE CURRENT REDUCTION FOR SINGLE PHASE FULL-BRIDGE POWER CONVERTER/INVERTER

CROSS-REFERENCE TO RELATED APPLICATIONS

This application claims priority of U.S. Provisional Patent Application Ser. No. 61/607,666, filed Mar. 7, 2012, which is hereby incorporated by reference in its entirety.

FIELD OF THE INVENTION

The present invention generally relates to power converters and voltage source modules and, more particularly, to bi-directional AC/DC power converters and reduction of leakage current therein.

BACKGROUND OF THE INVENTION

At the present time, electrical power is generally generated and distributed as alternating current (AC) power since voltage can be readily changed through use of transformers; allowing very high voltage and relatively low current for power transmission over large distances with reduced ohmic losses. However, many electrical and electronic devices must operate from a more or less constant voltage and conversion from AC power to direct current (DC) power is required. In some cases, it has been found effective to distribute power over relatively short distances as DC power. Such DC distribution arrangements are sometimes referred to as a DC nanogrid. Also, in recent years, environmental concerns have caused increased interest in so-called renewable energy resources such as solar power which is generated and stored as DC power but, when generated on a large scale, must be converted to AC power for transmission and distribution over the existing power distribution grid. Accordingly, power converters have been developed to not only convert AC power to DC power and vice-versa but also to transfer power bi-directionally.

To obtain maximum efficiency in power converters, various switching topologies are generally used rather than analog circuits, particularly to obtain regulated DC power or to obtain AC power of a desired frequency from DC power. Switching is generally performed at relatively high frequencies to accommodate large load transients and allow smaller and less costly magnetic components (e.g. transformers, inductors and the like) to be used. However, high frequency switching causes so-called electromagnetic interference (EMI) noise which must be removed by filtering. AC/DC converters may also exhibit leakage current at both the line frequency and double the line frequency as well as at the switching frequency, particularly when so-called unipolar pulse width modulation (UM), also referred to as three-level modulation, is used to drive the switches. Such leakage currents can present a safety issue as well as generating EMI noise and causing aging of components and apparatus connected to the power converter. Photovoltaic (PV) cells of which solar power generation systems are comprised are particularly subject to damage from leakage currents.

Most of the known power converter topologies for commercial solar power generation include a galvanic transformer that provides isolation from the power distribution grid. Isolation through use of a transformer not only ensures safety under most circumstances but also reduces EMI noise and step-up or step down of the DC power voltages developed by the PV cell arrays. However, if the transformer is operated at the low line frequency, the transformer must be of large size, weight and cost to deliver significant power. If the transformer is operated at a high switching frequency, more switching devices and conversion stages are required, significantly compromising overall system efficiency, cost, performance and reliability.

Accordingly, converter topologies that do not include a transformer have recently received substantial attention. Many such topologies are relatively simple and are of high reliability and efficiency for low voltage power ratings of 10 kW or less although they do not generally provide isolation. (Isolation is not required in the power distribution grid standards in many countries.) Among such topologies, the full-bridge topology is well-accepted in single phase power conversion applications such as are generally used for solar power generation using PV cell arrays.

Full bridge power converters are used as the rectifier to convert AC power for use by DC loads or power storage in batteries and for bi-directional power transfer, particularly where conversion between AC power and DC power is desired, such as in electric vehicles and small-scale AC/DC power distribution systems such as may be used in residences and vehicles such as aircraft or water-borne vessels and so-called DC nanogrids including both DC power sources and AC and/or DC loads and where power may be distributed over short distances as DC power.

Unipolar (so-called because the upper and lower switches switch between zero volts and +V/2 or −V/2, respectively) pulse width modulation (PWM), also referred to as three-level modulation, employs two sinusoidal reference signals of opposite signs to modulate switching pulse width in each phase leg and is usually used to operate full-bridge power converters due to the low differential mode (DM) noise generated which, in turn, allows use of an AC filter of relatively smaller size and cost. However, unipolar modulation generates a large high frequency leakage current flowing to ground through parasitic capacitance on the DC side of a full-bridge converter that can have a profound effect on the aging of components connected to the DC side of the converter, particularly PV cells as alluded to above and can compromise safety. The parasitic capacitance is of particularly large value and effects of leakage currents are particularly aggravated when the DC side is connected to an array of PV cells that may present an effective capacitor plate area that may be measured in acres. Therefore, such leakage current must be suppressed and several arrangements for doing so have been proposed which have proven effective to a greater or lesser degree. However, the leakage current suppression arrangements proposed to date have included additional active power switches which increase cost and produce additional switching losses as well as reducing reliability and requiring complex driving circuits. Further, some proposed leakage current suppression arrangements preclude bi-directional converter operation.

SUMMARY OF THE INVENTION

It is therefore an object of the present invention to provide a full-bridge power converter in which high frequency leakage current is suppressed using only passive filter components and without additional active power switches.

It is another object of the invention to provide a full-bridge power converter in which low frequency EMI noise and leakage current are reduced to extremely low levels by modified control of the switches forming the full-bridge circuit through use of a feedback circuit, either alone or in addition to suppressing high-frequency EMI noise and leakage current by filtering.

It is a further object of the invention to provide a modified unipolar modulation (UM) technique which substantially avoids the generation of low frequency EMI noise and corresponding leakage current.

In order to accomplish these and other objects of the invention, a full-bridge single phase bidirectional AC/DC power converter is provided having two phase legs on an AC side thereof and including a plurality of switches connected in a full bridge configuration, a choke comprising magnetically coupled windings connected in series in respective ones of the two phase legs, a split capacitor connected between the two phase legs, and a connection between a mid-point of the split capacitor and a split capacitor connected between DC voltage rails on a DC side of the power converter. An active filter, preferably constituted by a feedback arrangement, can additionally or separately employed to reduce low frequency common mode noise and leakage current.

In accordance with another aspect of the invention, a method of reducing common mode noise and leakage current through parasitic capacitance in a single phase, full bridge power converter having unipolar modulation of switches and having two phase legs on an AC side of said power converter is provided comprising steps of magnetically coupling the two phase legs opposingly, connecting a split capacitor across the two phase legs to form a mid point of the AC side of the converter, connecting a split capacitor across a DC side of the power converter to form a mid point of the DC side of the power converter, and connecting the mid point of the AC side of the power converter to the mid point of the DC side of the power converter.

BRIEF DESCRIPTION OF THE DRAWINGS

The foregoing and other objects, aspects and advantages will be better understood from the following detailed description of a preferred embodiment of the invention with reference to the drawings, in which:

FIG. 1A is a high-level block diagram of a generalized configuration of an AC/DC converter application, FIGS. 1B and 1C depict Particular embodiments and applications of FIG. 1A, FIGS. 2A and 2B are a schematic diagram of a full-bridge converter topology with AC filters and exemplary unipolar modulation drive arrangement and a graphical depiction of the drive waveforms for controlling the full-bridge switches in the circuit of FIG. 2A for providing AC/DC conversion, respectively.

DETAILED DESCRIPTION OF A PREFERRED EMBODIMENT OF THE INVENTION

Figure 2A:
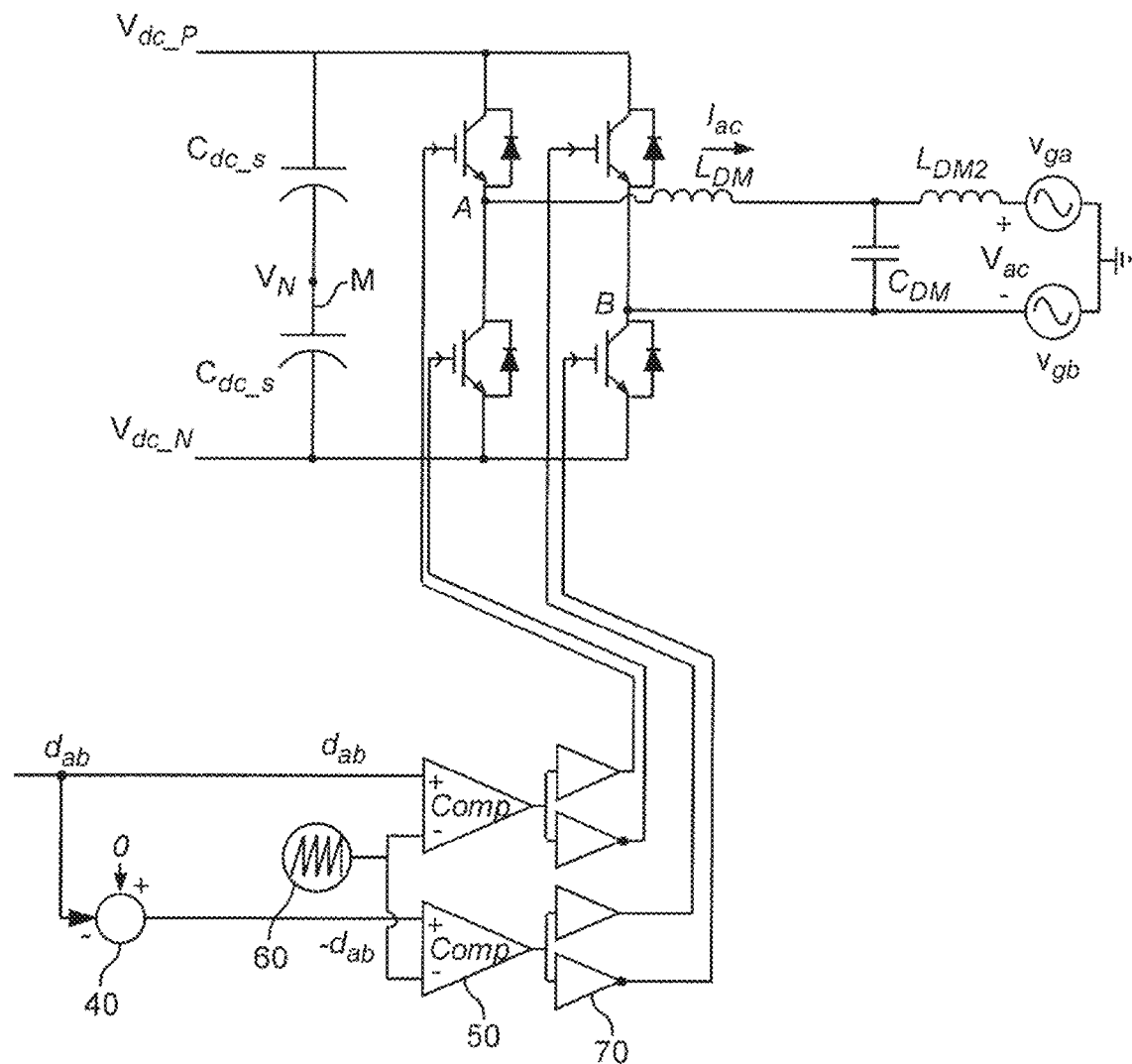
FIG. 2C is an enlarged view of two switching cycles depicted in FIG. 2B.
FIG. 2D illustrates the CM noise waveform measured across the DC rail and ground that is present in the circuit of FIG. 2A.

Referring now to the drawings, and more particularly to FIG. 1A, there is shown a high-level block diagram of a generic configuration of an application of a bi-directional power converter or inverter 10 interfacing between a DC power source, such as a photovoltaic (PV) cell array, as shown in FIG. 1B, or DC energy storage, as shown in FIG. 1C and/or load 20 and an AC power utility or distribution grid 30. As alluded to above, power can be transferred in either direction between DC source, storage or load 20 and the AC utility or distribution grid 30. For example, DC source, storage and/or load can be a single device such as a PV cell array, a storage battery or an electronic apparatus but could also be a DC distribution system such as a DC nanogrid, as alluded to above, which could include one or more of any of DC power sources, storage devices or loads, in which case, power transferred through converter 10 would be the net difference between power generated and power consumed from the nanogrid at any given time. Therefore, power converter or inverter 10 must be able to transfer power in either direction while converting between AC and DC power.

Figure 2B:
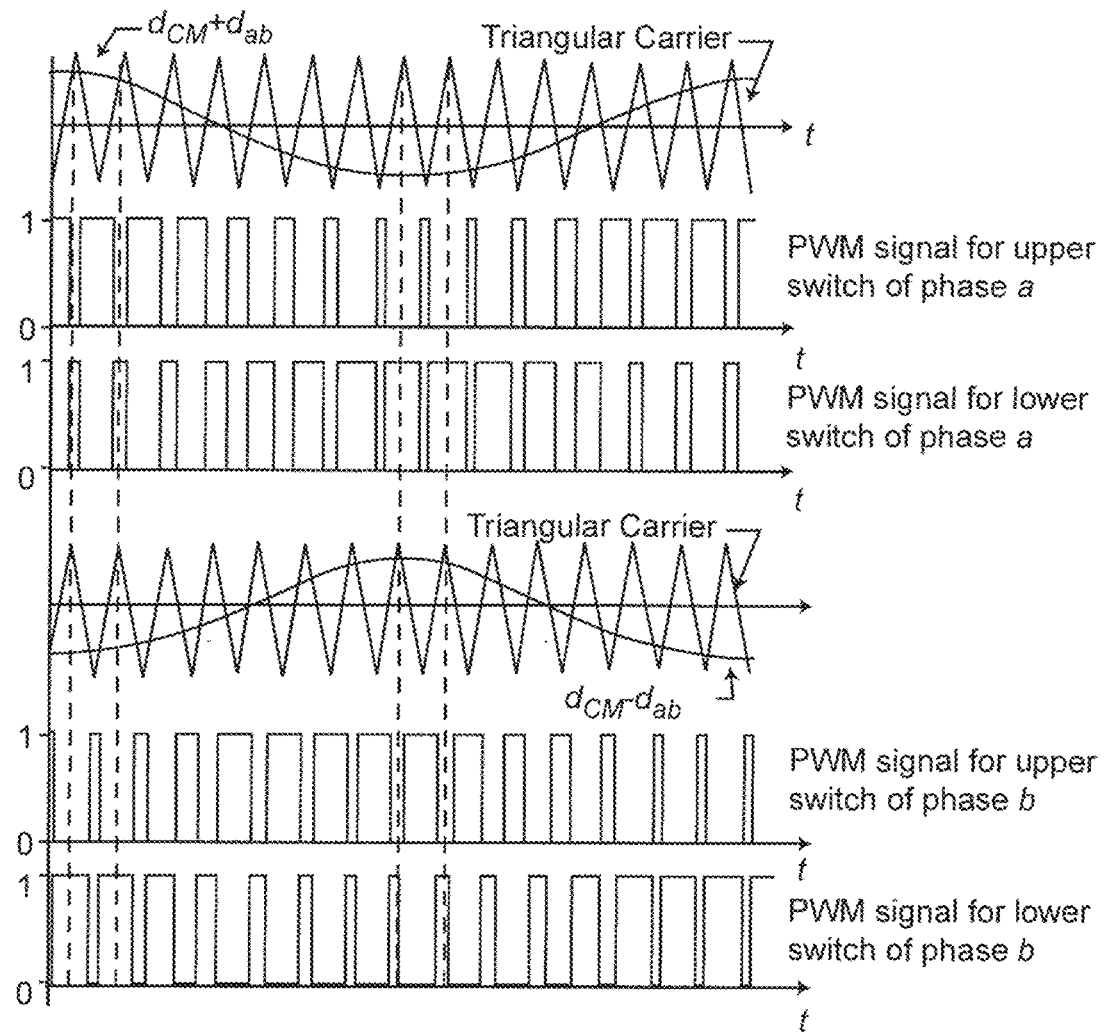

FIG. 2A is a schematic diagram of a full-bridge switching power converter capable of performing such a function. While the distinctive features of the invention are not shown in FIG. 2A, the Figure is arranged to facilitate an understanding and appreciation of the invention and no part of FIG. 2A is admitted to be prior art in regard to the invention. FIGS. 2A and 2B have thus been designated as "Related Art".

Such a power converter (which term should be understood to be inclusive of power inverters; the term generally applied to circuits which develop AC power from a DC power input) has a so-called AC side (depicted to the right side of this and other schematic diagrams herein) and a DC side (depicted to the left of this and other schematic diagrams herein) which are separated by the full-bridge switching circuit; the switches of which are suitably controlled by waveforms similar to those depicted in FIG. 2B. A filter capacitor (sometimes referred to as a DC link capacitor) is provided on the DC side of the power converter to provide filtering of ripple voltage and to avoid transient voltage fluctuations with changes in load of either the AC or DC sides of the converter. A split capacitor connected in parallel with the filter capacitor is also illustrated but is not necessary if the value of the filter or DC link capacitor is large but is important for purposes of explanation since the phase leg voltages are defined as being measured from the mid-point, M, of the split capacitor. On the AC side, a two-stage L-C-L filter is provided to limit distortion of the desired sinusoidal voltage due to switching transients and to reduce harmonic frequency content to levels specified by grid standards. In FIG. 2A, the so-called 10, split phase system (prevalent in North America) is depicted as AC voltages $V_{ga}$ and $V_{gb}$ connected between respective phase legs of the converter and ground which have the same RMS voltage amplitude but a one-half cycle phase difference. The voltages can then be coupled across two legs of a multi-phase power transmission grid for which a distribution transformer is often used to obtain a desired voltage. The L-C-L filter on the AC side of the converter and comprising inductors $L_{AC1}$ and $L_{AC2}$ and Capacitor $C_{DM}$ (so designated since it provides a path for differential mode (DM) noise) is a type of filter widely used to interface to an AC power distribution grid.

FIG. 2B shows exemplary switch drive waveforms suitable for controlling the switches of the full-bridge of FIG. 2A and the modulation waveforms from which the drive signals are derived. As shown in FIGS. 2A and 2B, a sinusoidal control waveform $d_{ab}$ of the desired AC frequency and its complement, developed and amplitude adjusted at adder 40, is compared, at comparators 50, in amplitude with a high switching frequency triangular waveform from triangular carrier waveform generator 60 and amplifier and inverted, if necessary, at inverters/amplifiers 70 such that respective full-bridge switches are either on or off when the triangular carrier waveform exceeds the amplitude of the sinusoidal carrier waveform $d_{ab}$. More specifically for each phase leg, the upper and lower switches are driven in a complementary fashion (that preferably includes some so-called dead time by slightly delaying switch turn-on during each switching cycle) such that there is never a direct conduction path between the positive and negative DC voltage rails and the pulse width increases and decreases in the respective phase legs in a complementary fashion to cause a step-wise sinusoidal increase and decrease in the amount of current delivered to or from the negative and positive DC rails at $V_{dc\_N}$ and $V_{dc\_P}$, respectively. This step-wise increase and decrease in current is then smoothed into a substantially sinusoidal increase and decrease in voltage in the L-C-L filter alluded to above.

Figure 2C:
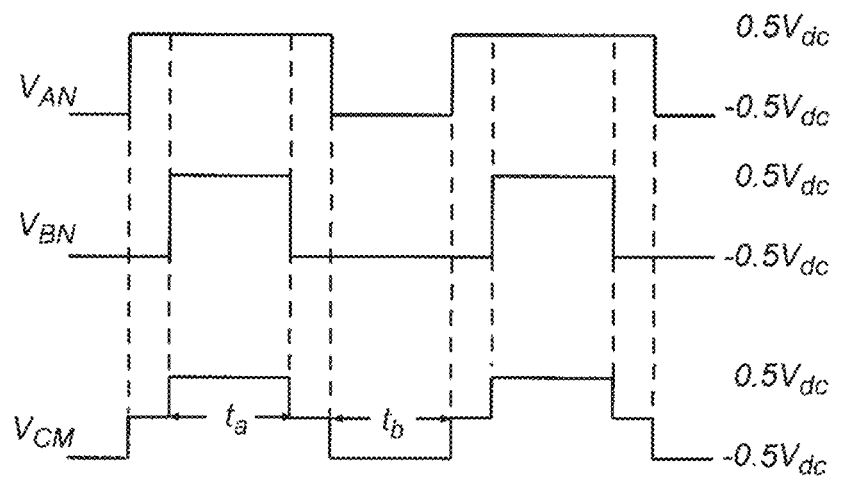
Figure 2D:
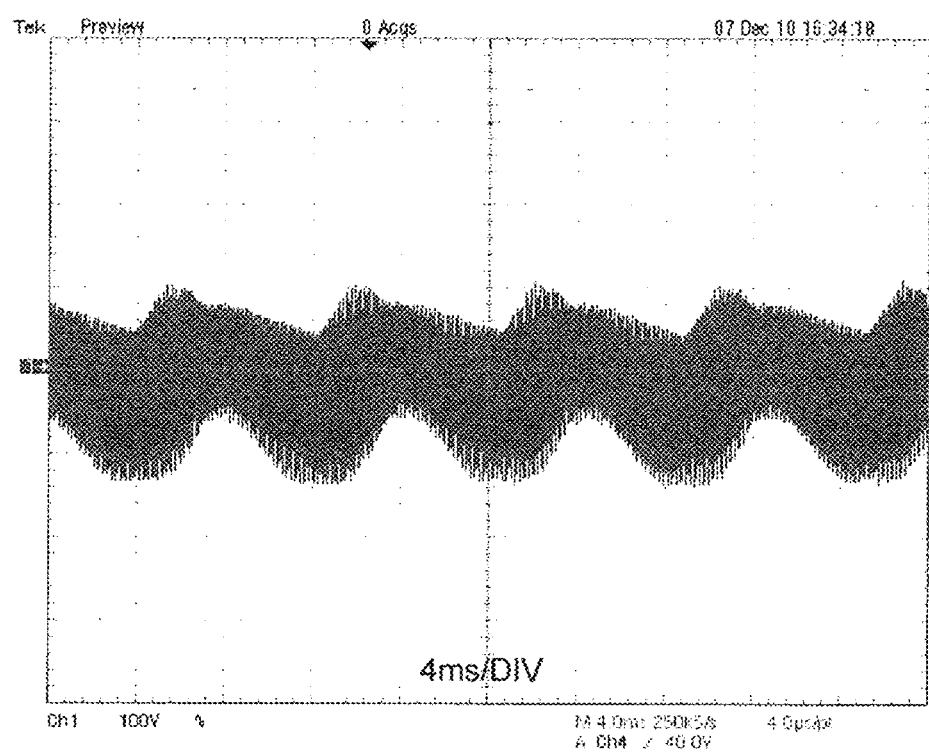

However, using such a modulation technique, there is necessarily a period of time in each high frequency switching cycle when both phase legs are connected to either the positive or negative DC rail as can be seen by following the vertical dashed lines in FIG. 2B. An enlarged view of two switching cycles is shown (with the corresponding vertical dashed line) in FIG. 2C. During the period when both phase legs are connected to the same DC rail voltage, there is no difference in applied voltage between them. Such a condition is referred to as a zero voltage state and the alternating zero voltage states when both phase legs are connected alternatingly to the positive and negative DC rails, respectively cause a step-wise alternating common mode (CM) noise voltage, $v_{CM}$, in both the AC and DC sides of the converter, as illustrated in FIG. 2C. (It should be noted, however, that the location(s) where the CM noise can be observed depends on the location of ground in the circuit. Usually, the mid-point of the grid on the AC side is tied to ground and is referred to as low impedance grounding. In such a case, the CM noise generated will be observed on the DC side of the converter due to the much larger impedance of the stray/parasitic capacitance between the DC rails and ground.) During the zero voltage state, the DC side of the converter is exposed to CM noise generated by converter PWM switching actions due to the low impedance grounding scheme on the AC side. Since the duty cycle/pulse width of the high frequency switching control signals are continuously varying, the CM noise has a very complex waveform as shown in FIG. 2D and, consequently, a broad spectrum that is difficult to filter. CM noise can also be transferred into the converter when full bridge switches of both phase legs are coupled to the positive or negative DC rails and CM noise is particularly large during those periods as reflected in the known approaches to CM noise reduction as will be discussed below in connection with FIGS. 4A-4E. Thus, the CM noise voltage on the DC side induces leakage current through parasitic capacitance to ground, particularly if the parasitic capacitance to ground is large, as is the case for large PV cell arrays used for solar power collection.

Other than the high frequency CM noise generated in the converter, line frequency and double line frequency CM noise also appear on the DC side of the converter due to transfer of power through the converter. More specifically, as power is transferred through the full-bridge switches (e.g. when power is drawn from either side of the converter), a ripple voltage, $v_{ripple}$, will be generated at double the AC line frequency and will appear on the DC side of the converter. Thus, the DC link voltage (e.g. the voltage appearing on the DC side that is linked to other apparatus that stores and/or consumes power) will be comprised of the sum of the average voltage and the ripple voltage $$V_{dc} = V_{dc} + V_{ripple}. \quad (1)$$

The ripple voltage appears on both nodes P and N of the DC side of the converter and is thus CM noise.

Figure 3:
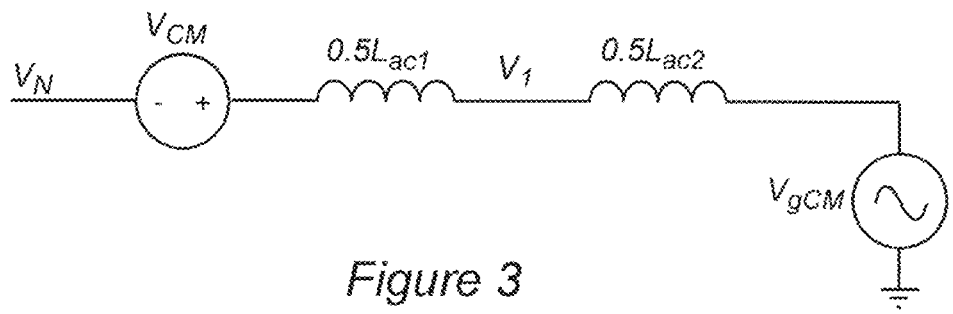
FIG. 3 is a schematic diagram of a common mode (CN) noise equivalent circuit of the circuit shown in FIG. 2A, FIGS. 4A, 4B, 4C, 4D and 4E are schematic diagrams of known active switching arrangements for reducing common mode noise and leakage current.

The CM noise with respect to ground can be observed at the mid-point of the DC link voltage which can be physically achieved by a split capacitor connection comprising a series connection of two split capacitors $C_{dc\_n}$ forming mid-point node M as a voltage $v_N$ which is the voltage between node M and ground. The CM noise voltage equivalent circuit of the circuit of FIG. 2A is shown in FIG. 3. Due to the symmetrical topology of the full-bridge converter, the CM voltage $v_{CM}$ with respect to node N that is generated by unipolar modulation (UM) is given by:

$$v_{CM} = (v_{AN} + v_{BN})/2 \quad (2)$$

in which $v_{AN}$ and $v_{BN}$ devote the terminal voltages of the two phase legs of the AC side of the converter with respect to the voltage $v_N$ at the mid-point M of the DC-link. The spectra of these voltages dan be obtained by applying a double-Fourier analysis of UM. Similarly, $v_{gCM}$ is the grid CM voltage given by:

$$v_{gCM} = (v_{ga} + v_{gb})/2 \quad (3)$$

when there are asymmetrical loadings of distribution transformer windings. Therefore the negative DC rail voltage is obtained as $$v_{dc\_n} = v_N - v_{dc}/2 \quad (4)$$

and it is evident that $v_{dc\_N}$ mainly comprises four components: 60 Hz (or the fundamental AC frequency) from $v_{gCM}$, DC and 120 Hz (or double the fundamental AC frequency) from $v_{dc}$ and the switching frequency component from $v_{CM}$. All but the DC component are contributors to the leakage current.

Figure 4A:
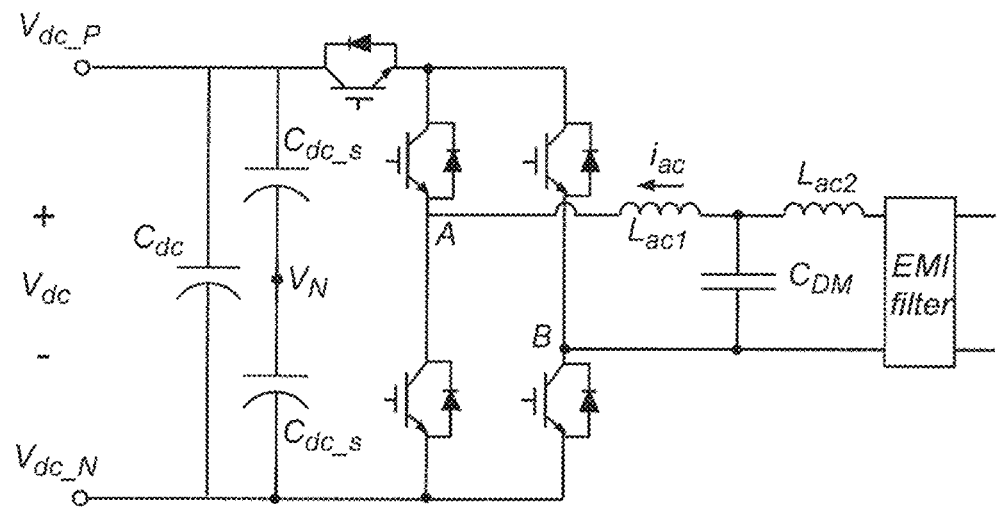

Several known methods of suppressing CM noise are shown in FIGS. 4A-4E. FIG. 4A illustrates a so-called H5 inverter which includes an extra switch in the positive DC rail of the DC link to isolate the apparatus that is connected to the DC side of the converter during the zero voltage state; leading to higher conduction losses as well as increasing switching losses and compromising reliability and requires substantial complexity for sequencing the fifth switch.

Figure 4B:
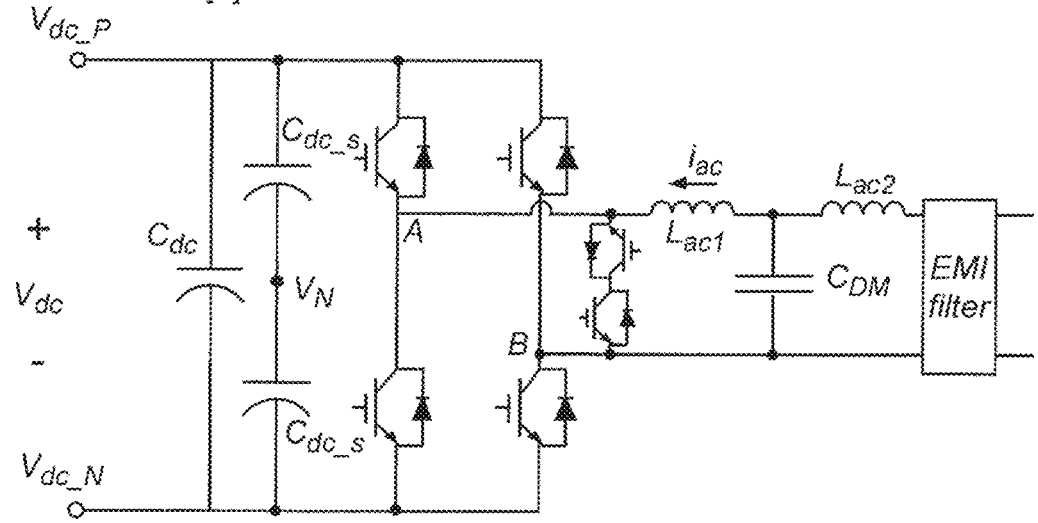

FIG. 4B schematically illustrates the so-called HERIC inverter which utilizes two back-to-back IGGBTs is series between the phase legs which provides a bypass for bi-directional current conduction. This bi-directional bypass also serves to isolate the apparatus connected to the DC link during the zero voltage state and is effective to eliminate the high frequency components of the CM noise and leaving only the low frequency components of CM noise which cause comparatively far less leakage current through whatever value of parasitic capacitance is presented than the high frequency components. The principal drawback of this arrangement is, again, the presence of switches with their attendant losses and consequent compromise of reliability and the increased complexity of properly driving them.

Figure 4C:
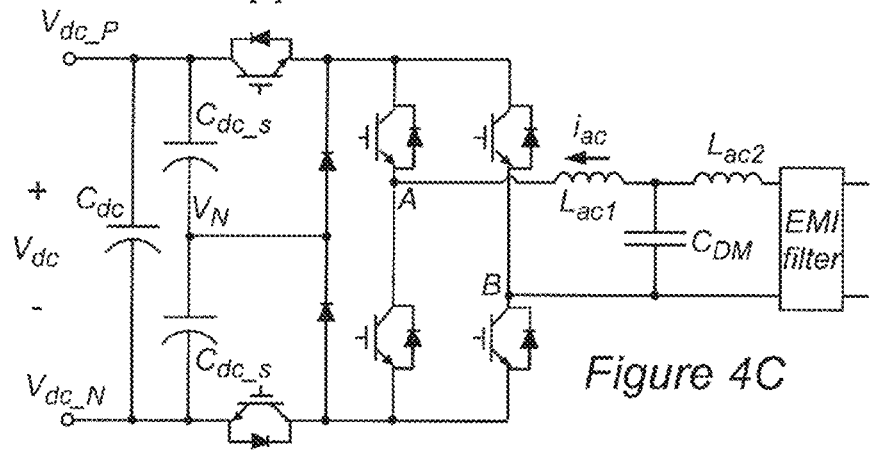

FIG. 4C schematically illustrates a full-bridge with DC bypass (FE-DCBP) inverter. This topology features two isolation switches (each similar to the fifth switch of the H5 inverter) and two clamping diodes for clamping the output to the mid-point of the split capacitor during the zero voltage state periods. This is also a relatively effective topology but, due to the additional switches, suffers problems of complexity, reliability and conduction and switching losses. The increased component count also increases cost relative to the H5 and HERIC inverter approaches.

Figure 4D:
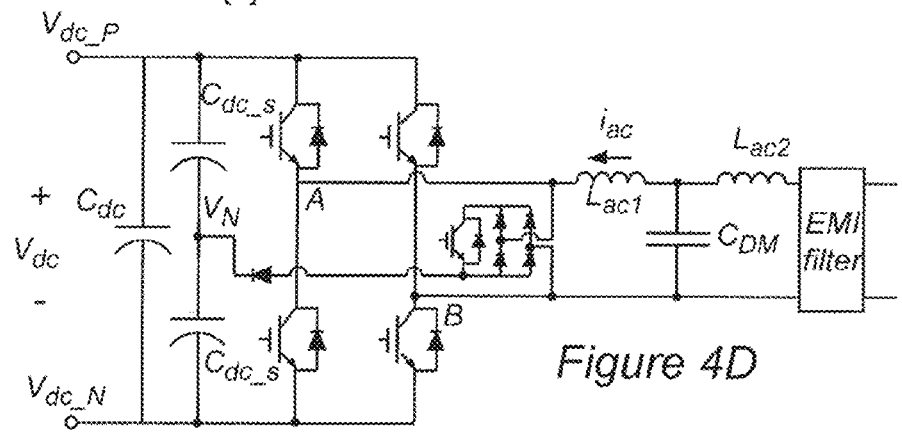

FIG. 4D schematically illustrates a full-bridge, zero voltage rectifier (FB-ZVR) approach to reduction of CM noise. This topology is somewhat similar to the HERIC inverter approach but uses a diode bridge, shunted by a switch and a diode clamp to the mid-point of the split capacitor of the DC link to isolate the DC-link from the grid and the switching noise of the full bridge circuit which also reduces the predominant high frequency CM noise. In this approach, the high cost of the increased component count is the principal drawback in addition to the increased complexity and compromise of reliability.

Figure 4E:
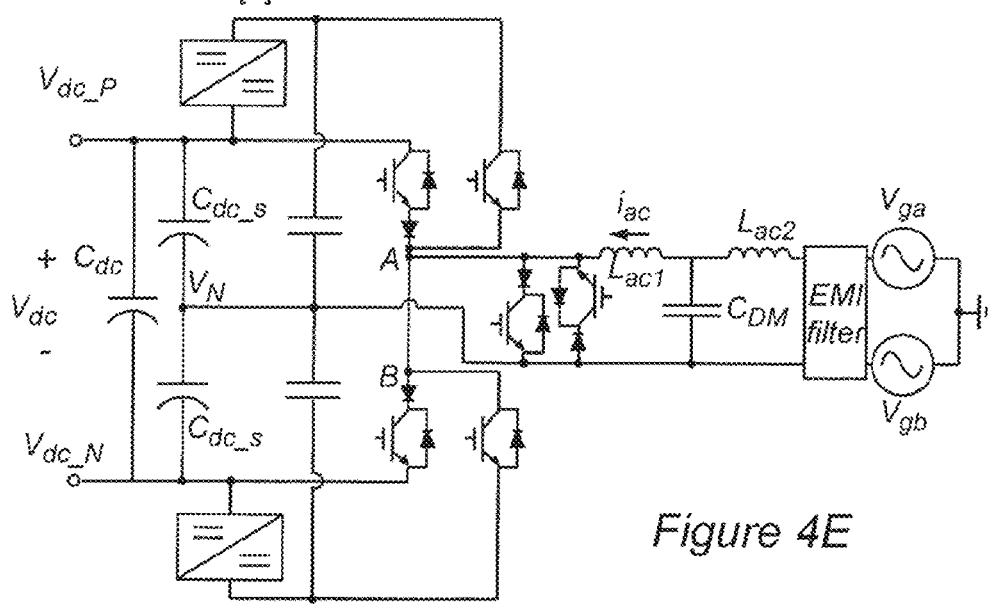

FIG. 4E schematically illustrates the so-called REFU inverter. This approach uses a half bridge switching arrangement with additional DC/DC converters that can be bypassed and a different AC side bypass configuration from that of the HERIC inverter that blocks the free-wheeling path. This configuration is also effective to suppress high frequency CM noise but carries a high cost and additional losses due to increased component count.

Therefore, the known approaches to suppression of CM noise all suffer from increased cost and complexity and compromise of reliability due to reliance on additional switches. None are fully effective to suppress CM noise since they principally operate only during the zero voltage state period of the switching cycles and generally do not significantly affect low frequency CM noise. Further, some of these approaches may preclude bi-directional operation and/or may not suppress CM noise generated in the converter. Since they are designed for solar power generation installations and not for local DC distribution systems such as DC nanogrids and are principally directed to isolation of the DC link from a power distribution grid during the zero voltage state where bi-directional operation is not of interest. Importantly, however, while component failures may be relatively rare, failure of the additional switch or switches while the full-bridge switches remain operative can lead to high leakage current which is difficult to monitor and consequent safety problems while the converter remains otherwise operable.

Figure 5:
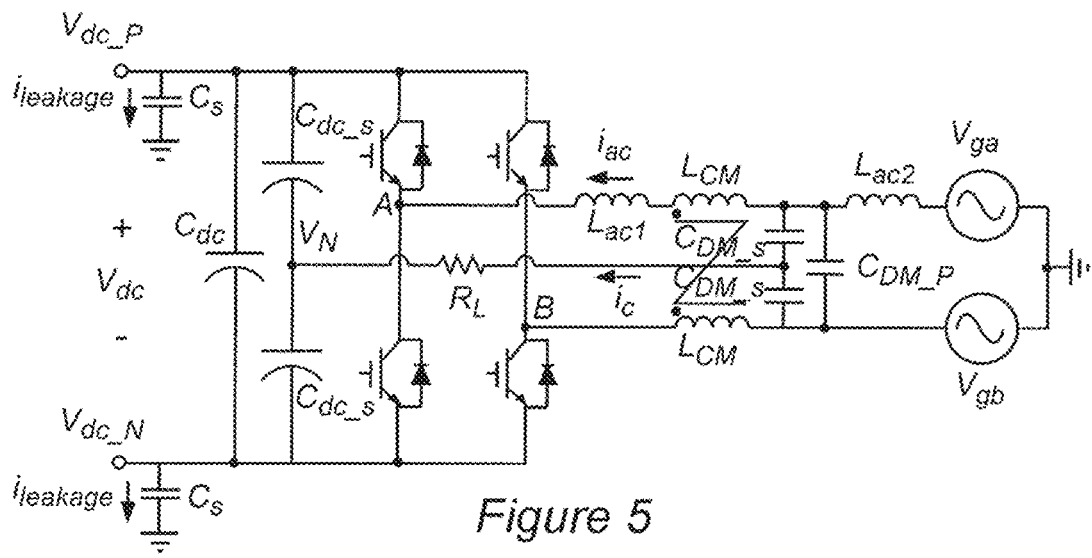
FIG. 5 is a schematic diagram of a full-bridge converter circuit with a modified L-C-L AC filter in accordance with the invention.

Referring now to FIG. 5, a schematic of an exemplary embodiment of the invention which may be sufficient for many applications is shown. By comparison to the schematic of FIG. 2, it is seen that the full-bridge switching circuit and the DC side filter capacitors are the same as in FIG. 2. However, the L-C-L filter on the AC side has been modified to reconfigure a portion of the $C_{DM}$ capacitance as series connected split capacitors $C_{DM\_s}$ connected between the phase legs in parallel with $C_{DM}$ (to avoid changing the behavior of the DM noise path) and a choke inductor having magnetically cross-coupled windings $L_{CM}$ connected in series in both phase legs of the AC side of the converter. A further connection is made between the mid-point of split capacitors $C_{dc\_s}$ and split capacitors $C_{DM\_s}$, preferably and optionally including a small resistance $R_L$ to provide damping. In this configuration, the choke $L_{CM}$ greatly attenuates the high, switching frequency component of the CM noise; allowing the L-C-L filter to be decreased in size. The CM noise equivalent circuit is shown in FIG. 6.

Figure 6:
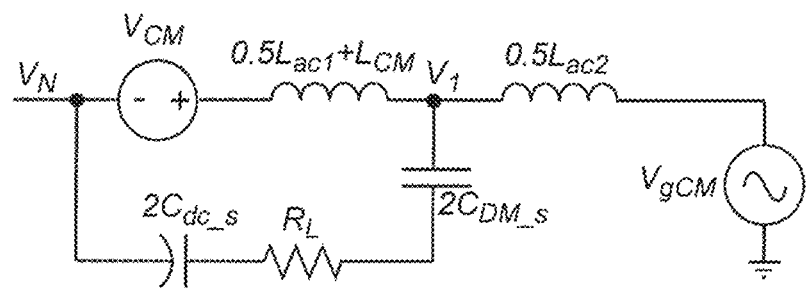
FIG. 6 is schematic diagram of a common mode (CM) noise equivalent circuit of the circuit of FIG. 5, FIG. 7 provide a graphical comparison with FIG. 2D of CM noise in the circuits of FIGS. 3 and 5 (e.g. with L-C-L filter and modified L-C-L filter in accordance with the invention, respectively)

It is readily seen from FIG. 6 that a LC low pass filter is formed to attenuate the high frequency CM noise generated by $v_{CN}$. The negative DC rail voltage $v_{dc\_N}$ in FIG. 6 is given by:

$$V_{dc\_N}(\omega) = \tag{5}$$

$$v_{gCM} - \frac{1}{2}v_{dc} - \frac{v_{CM}(\omega)\sqrt{\left[\frac{1}{(\omega R_L)^2(2C_{DM\_s}\,//\,2C_{dc\_s})^2}\right]+1}}{\sqrt{\left[\frac{1-\omega^2(0.5L_{DM}+L_{CM})\cdot(2C_{DM\_s}\,//\,2C_{dc\_s})}{(\omega R_L)(2C_{DM\_s}\,//\,2C_{dc\_s})}\right]^2+1}}$$

in which ω is the frequency of the noise of interest and "//" represents two components in parallel.

Since $C_{dc}$ and $L_{ac1}$ are much larger than $C_{DM}$ and $L_{CM}$, equation (5) can be simplified to $$V_{dc\_N}(\omega) = \tag{6}$$

$$v_{gCM} - \frac{1}{2}v_{dc} - \frac{v_{CM}(\omega)\sqrt{(\omega R_L \cdot 2C_{DM\_s})^2+1}}{\sqrt{(1-\omega^2 L_{CM}\cdot 2C_{DM\_s})^2+(\omega R_L \cdot 2C_{DM\_s})^2}}$$

In equation (6), an attenuation term is applied to the switching frequency voltage CM noise, $v_{CM}$. As such, the leakage current, $i_{leakage}$, flowing through the parasitic capacitances $C_s$ is greatly reduced. Specifically, for exemplary values of various circuit components, the waveform of $v_{dc\_N}$ is as shown in FIG. 2D, as alluded to above. When the modified filter structure of FIG. 5 is applied to a circuit otherwise unmodified and operated using the same operating parameters, the complex waveform of FIG. 2D is reduced to the small amplitude, low frequency waveform of FIG. 7 from which it can be observed that any high frequency component of the CM noise is very small. However, for a given parasitic or stray capacitance to ground, $C_s$, the leakage current for a given amplitude of a component of CM noise of a given frequency is relatively much smaller than for higher frequency components. Therefore, it can be readily appreciated that the inverter circuit of FIG. 5 having the modified filter circuit in accordance with the invention provides a substantial solution to the problem of leakage current and attendant component aging and safety issues with only passive components which are much less likely to fail than the active switches in known CM noise suppression arrangements discussed above. Further, the effectiveness of the modified filter in accordance with the invention is sufficient to allow simplification and reduction in size of the EMI filter that is generally required on the AC side to prevent EMI noise from being connected to an AC distribution grid.

Figure 7:
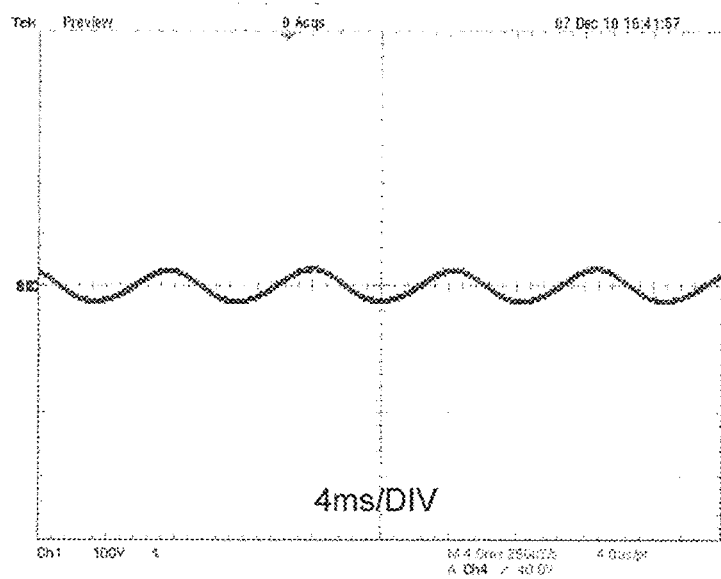

However, the low frequency DC side voltage ripple of FIG. 7 still causes a small degree of current leakage and, due to safety regulations, constrains the DC side EMI capacitor value in all DC components in the DC system, thereby yielding bulky design of magnetic components on the DC side since the corner frequency of any low pass filter design must be much lower than the low frequency CM noise and the filter will necessarily be very large due to the required size of magnetic components to carry sufficient current at such frequencies. Otherwise, the modified AC side high frequency filter arrangement in accordance with the invention need not be large and provides a substantial solution to the current leakage problem using only highly reliable passive components which are substantially limited to the addition of magnetically coupled windings to function as a high frequency choke and a split capacitor even though some particular design considerations for the choke are preferred as will be discussed below.

The low frequency CM voltage ripple as shown in FIG. 7 is mostly due to $v_{gCM}$ and $v_{ripple}$ and can be attenuated using DC side CM filters. Due to the limited values imposed on the value of DC side CM capacitors, the total size of the CM choke is relatively large and limits the overall power density of the converter that can be achieved. However, the inventors have found that providing subtle changes in the UM waveforms which can be derived in a relatively simple manner can provide substantial elimination of the low frequency CM noise by operating the full bridge switches to function as an active filter.

Figure 8A:
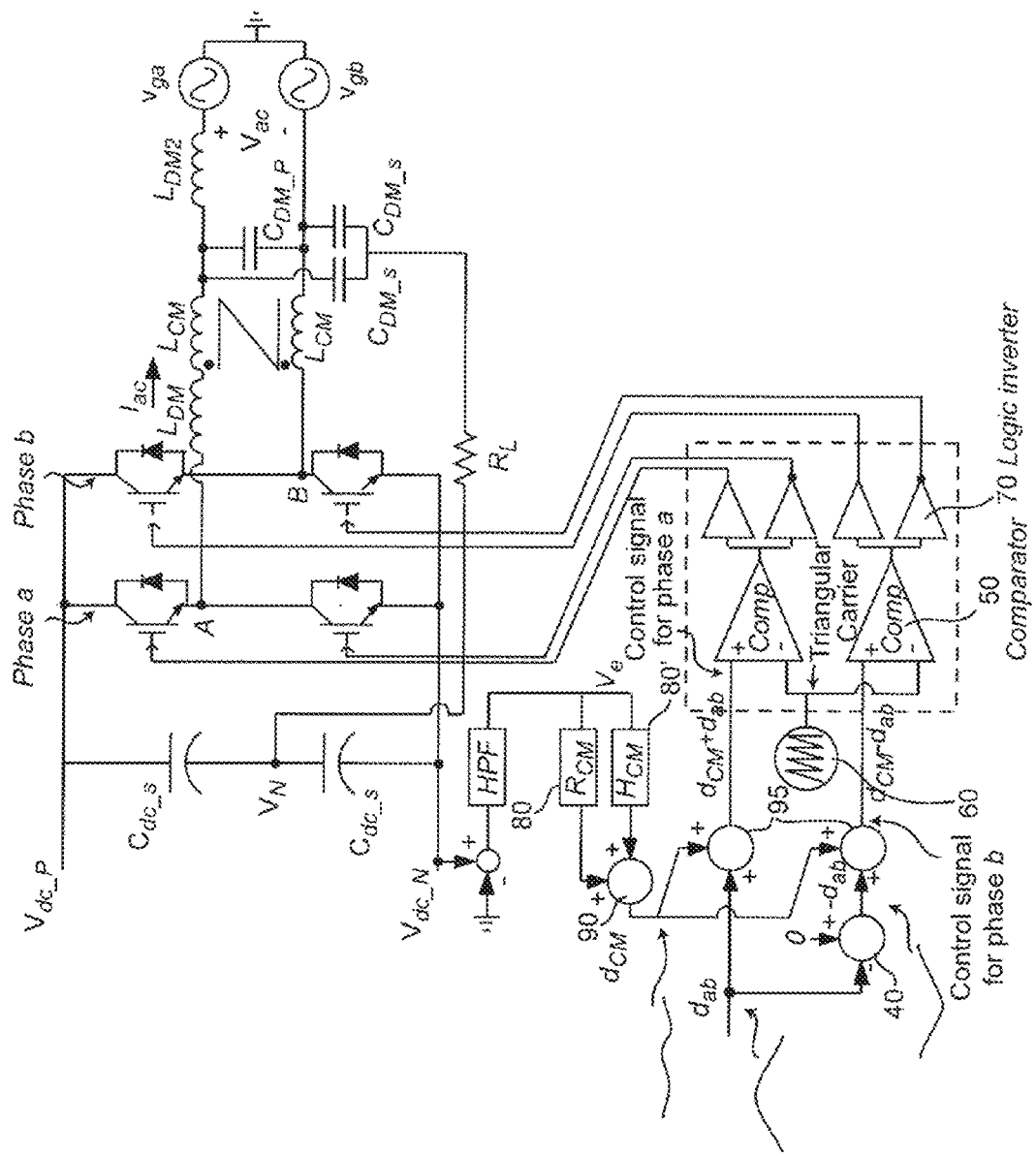
FIGS. 8A, 8B and 8C are a schematic diagram of a preferred embodiment of the invention including the perfecting feature of a feedback circuit to modify the UM scheme to remove low frequency EMI noise, modified full bridge drive waveforms and a detail of drive waveforms, respectively, which provide for a comparison with FIGS. 2A-2C.

Specifically, referring now to FIG. 8A, an additional feedback control signal, $d_{CM}$, can be derived directly from the low frequency CM noise at the negative DC rail and combined with sinusoidal control signal, $d_{ab}$, to substantially cancel the low frequency CM ripple. Specifically, the voltage on the negative DC rail (or, optionally, the positive DC rail or both) could be averaged or otherwise combined, subjected to preferably digital (to increase noise immunity) high pass filtering to block any DC component and applying the resulting CM ripple signal to two compensators, 80 and 80', having transfer functions of $$H_{CM}(s) = K \frac{(s+\omega_{z1})(s+\omega_{z2})}{s(s+\omega_{p1})(s+\omega_{p1})} \quad (7)$$

and $$R_{CM}(s) = 2k \frac{s}{s^2 + (2\omega_o)^2}, \; \omega_o = 2\pi 60 \text{ rad/s} \quad (8)$$

respectively. In equation (7) two zeroes are placed around the resonant frequency ($L_{CM}$, $2C_{DM}$) for desired phase margin and two poles are placed after the crossover frequency to attenuate high frequency noises. The transfer function $R_{CM}$ of equation (8) achieves high loop gain at 120 Hz for better control performance. The error signals as respectively modified by transfer functions of equations (7) and (8) are combined by adder 90 and the results added to the complementary sinusoidal control signals at adders 95. The corresponding low frequency CM voltage in the full bridge output terminals is given by $$v_{CM} = \frac{1}{2}[V_{AN} + V_{BN}] \quad (9)$$
$$= \frac{1}{2}\left[\frac{1}{2}v_{dc}(d_{CM} + d_{ab}) + \frac{1}{2}v_{dc}(d_{CM} - d_{ab})\right]$$
$$= \frac{v_{dc}}{2}d_{CM}$$

Figure 8B:
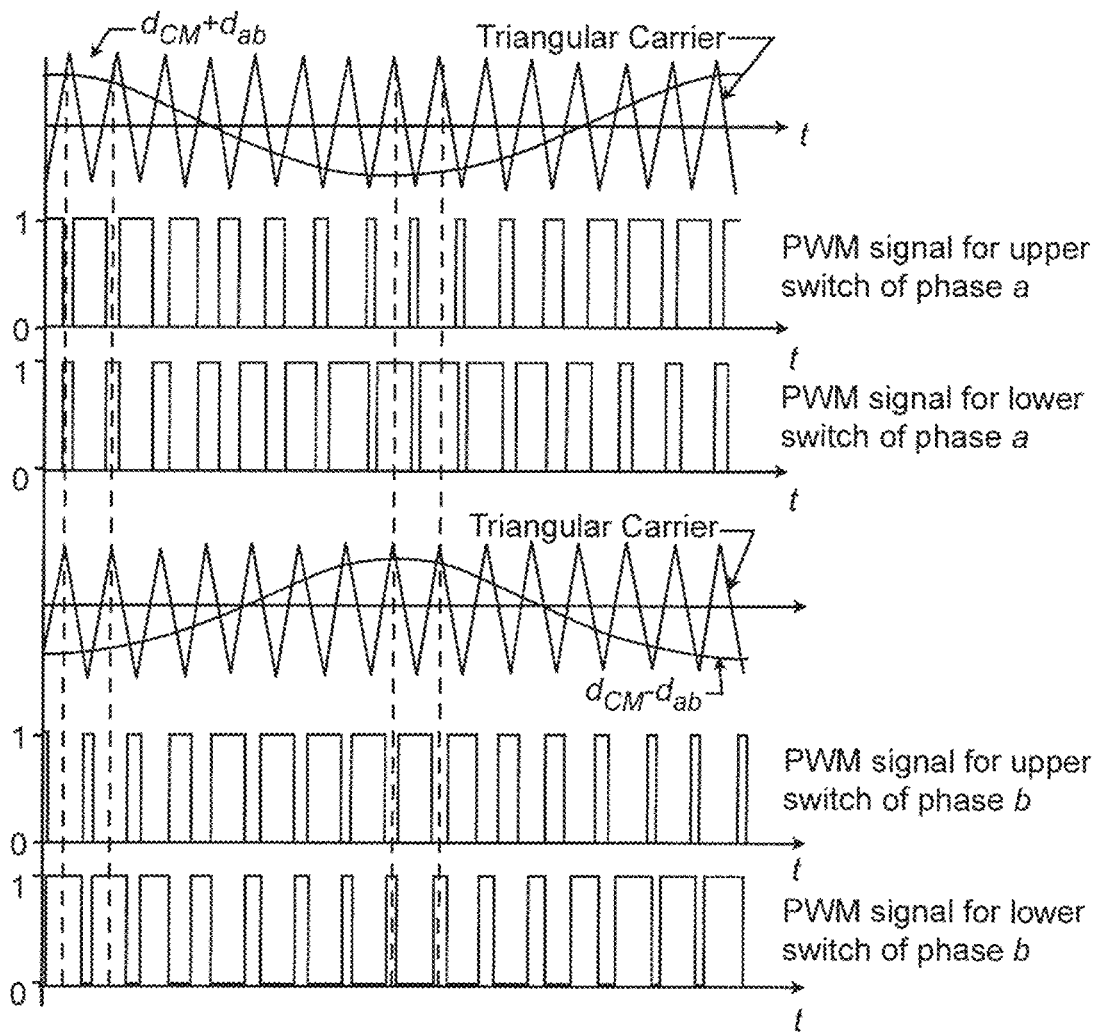
Figure 8C:
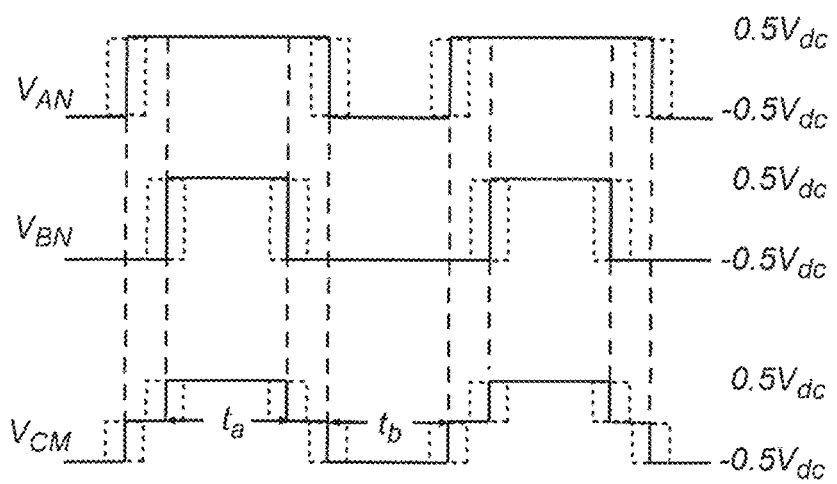

This subtly altered, combined control signal results in a small alteration of timing of the duty cycle or pulse width of the full bridge switch control pulses which, while not visible in the waveforms of FIG. 8B, is indicated by dashed lines in FIG. 8C representing the periodic expansion and contraction of the full bridge switch control signals which cancels the low frequency CM ripple.

Figure 9:
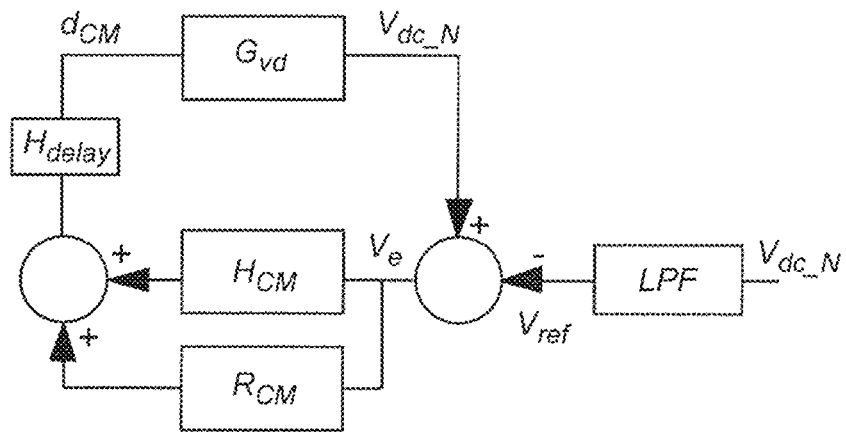
FIG. 9 is a high level block diagram of the feedback control of FIG. 8A.
Figure 10:
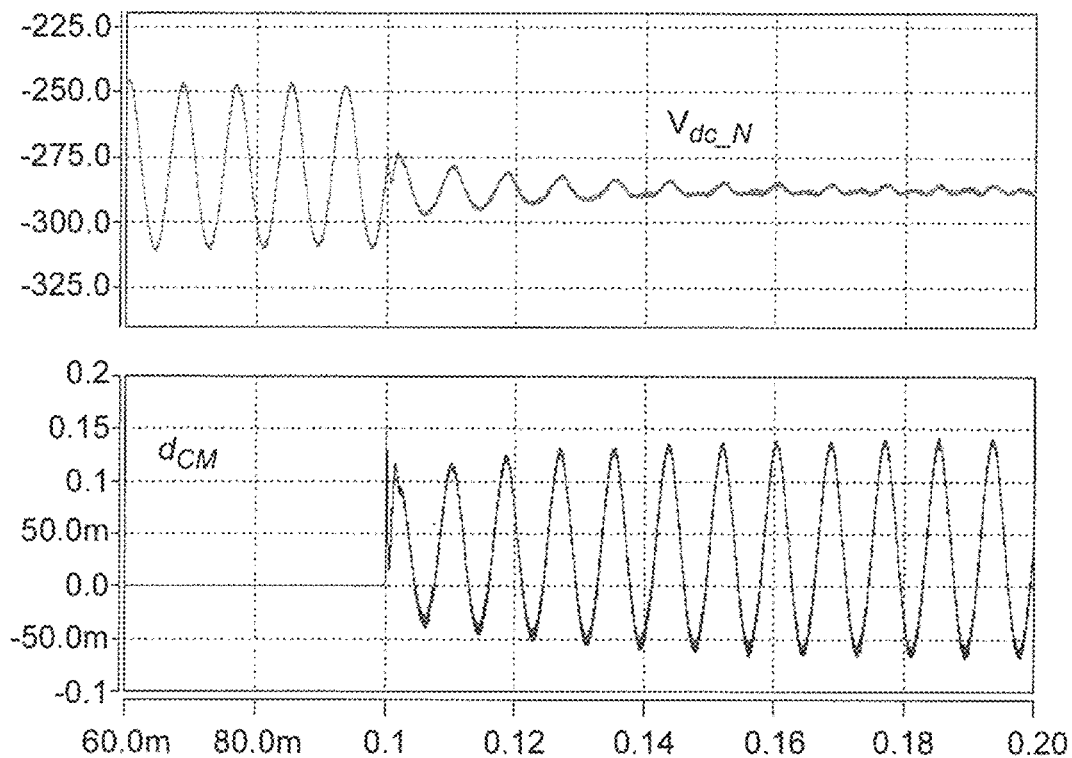
FIG. 10 illustrates waveforms of the CM noise voltage measured across the DC rail and ground and the feedback control voltage at a transient time when the feedback arrangement of FIG. 8A is activated to provide modified UM control.
Figure 11:
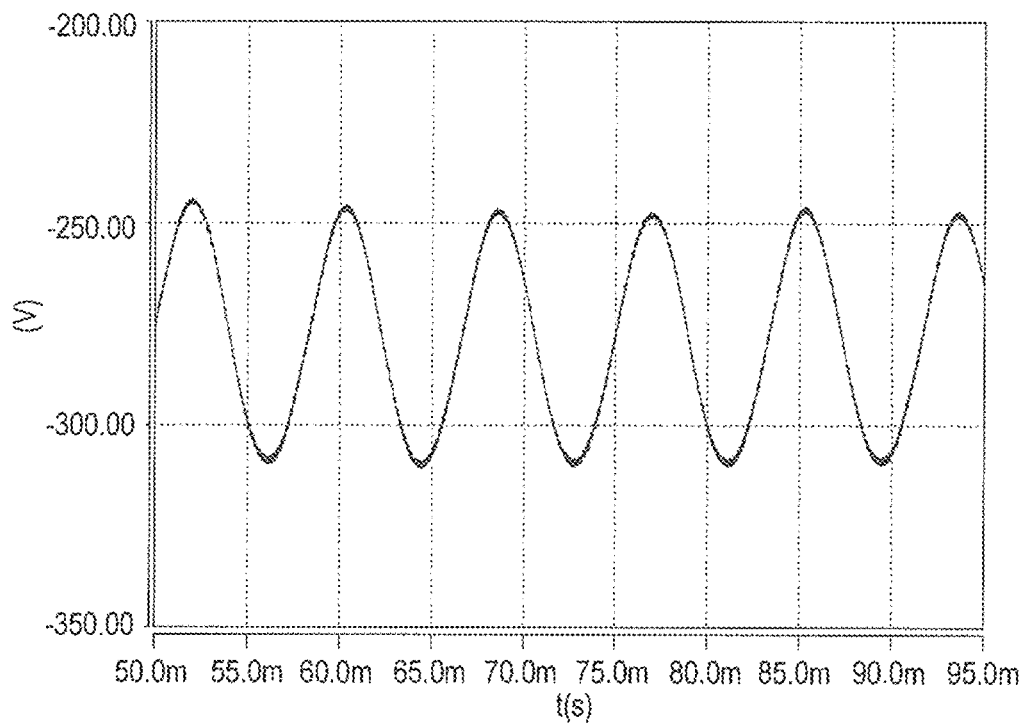
FIGS. 11 and 12 illustrate a comparison of the negative DC rail CM voltage measured from the DC rails without and with the feedback-modified UM control which functions as an active filter.
Figure 12:
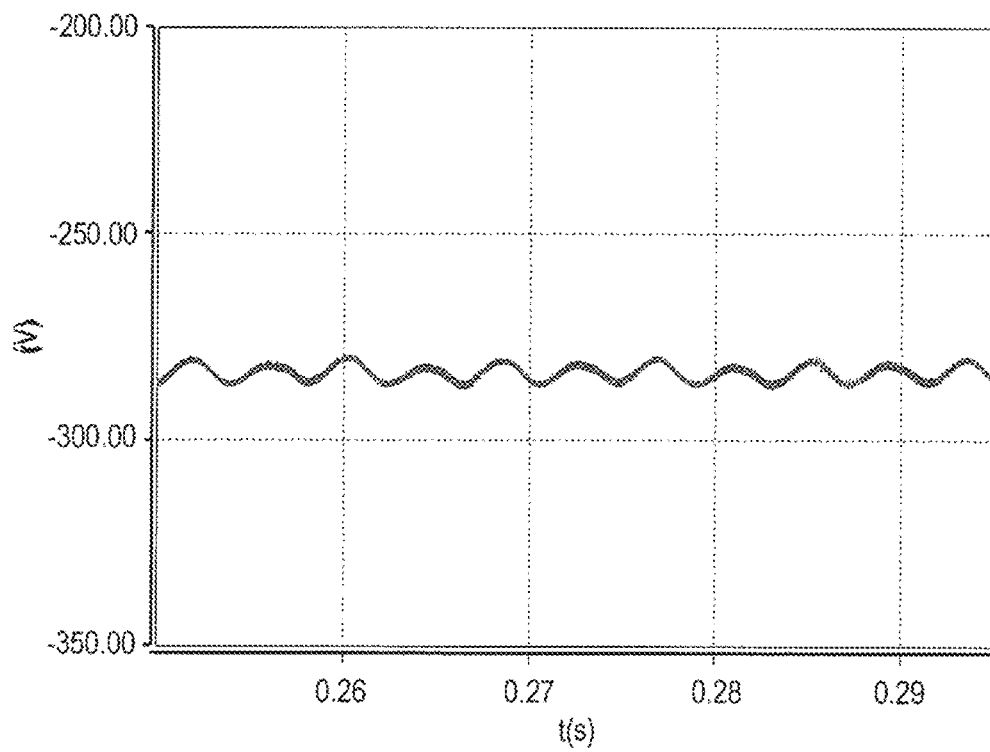

The state feedback control block diagram is illustrated in FIG. 9, wherein the additional transfer functions of $G_{vd}$ and $H_{delay}$ are given by $$G_{vd}(s) = \frac{\tilde{v}_{dc\_N}}{\tilde{d}_{CM}} \quad (10)$$
$$= -\frac{v_{dc}}{2} \frac{sR_L \cdot 2C_{DM\_s} + 1}{s^2 L_{CM} \cdot 2C_{DM\_s} + sR_L \cdot 2C_{DM\_s} + 1}$$

and $$H_{delay}(s) = e^{-sT_s} \quad (11)$$
$$= \frac{1 - 0.5sT_s + \left(\frac{sT_s}{12}\right)^2}{1 + 0.5sT_s + \left(\frac{sT_s}{12}\right)^2}$$

respectively, which can be developed as special purpose digital processors specific to these respective calculations (e.g. as application specific integrated circuits or ASICs); suitable designs for which will be evident to those skilled in the art from the transfer functions given above. The control voltage reference, $V_{ref}$ is the DC component of $v_{dc\_n}$ generated by a low pass filter although this function is preferably physically performed by the high pass filter HPF of FIG. 10 in the course of generating error signal $v_e$.

Figure 13:
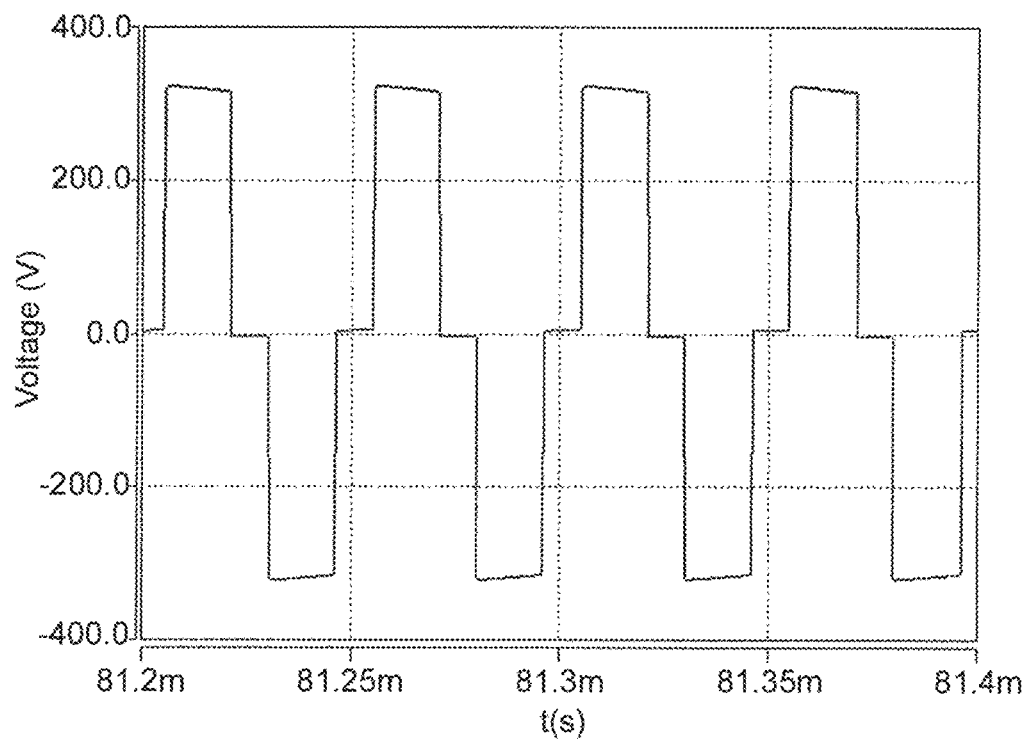
FIGS. 13 and 14 illustrate waveforms useful in understanding CM choke design for practice of the invention.
Figure 14:
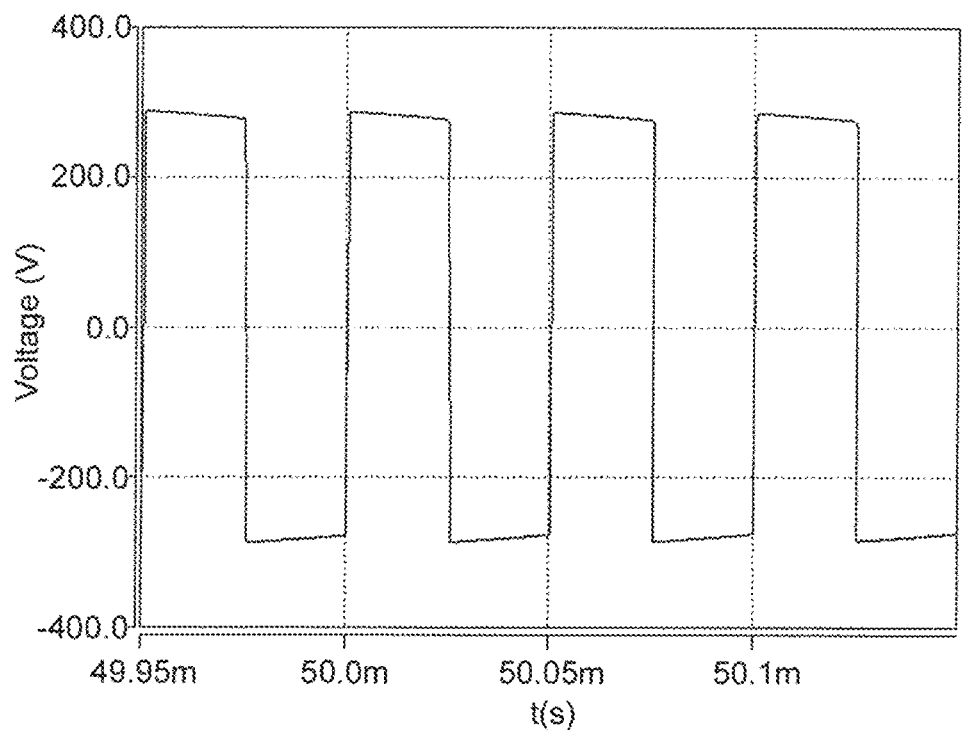

The arrangement illustrated in FIGS. 8A and 9 has proven to be extremely effective to substantially eliminate low frequency CM noise (e.g. substantially all remaining CM noise not attenuated by the modified filter of FIG. 5). A measure of the degree of effectiveness of this additional feedback control signal can be appreciated from the transient response illustrated in FIG. 10 when control signal $d_{CM}$ is added to control signal $d_{ab}$. The amplitude of the ripple is greatly reduced immediately and substantially vanishes over about eight switching cycles. It may be helpful to note that the waveform of $d_{CM}$ shown in FIG. 10 varies slightly in amplitude and modulates the full bridge switch control pulse width at both 60 and 120 Hz and that the amplitude corresponds to the shift in leading and trailing edges of switch control pulses illustrated by dashed lines in FIG. 8C as compared with FIG. 2C as alluded to above. FIGS. 13 and 14 provide a comparison of the CM noise in the circuits of FIGS. 5 and 8A.

The preferred design of $L_{CM}$ alluded to above should take the saturation issue into account, since an extra low-frequency CM voltage excitation is applied on the $L_{CM}$. Besides the leakage inductance of $L_{CM}$, the major contributor to the saturation of the $L_{CM}$ is the volt-second VS in equation (12) due to the CM voltage applied on the CM choke $L_{CM}$.

$$VS = \int V_{cmc} dt \quad (12)$$

$V_{CMC}$ is the common-mode voltage applied on $L_{CM}$. There are two frequency volt-second components: switching frequency volt-second and low-frequency volt-second.

The switching-frequency volt-second is due to the PWM switching. There are two possible switching-frequency maximum volt-second points, as shown in FIGS. 13 and 14. One occurs when the AC current $I_{ac}$ is zero-crossing. At this instant, the CM duty-cycle reaches the peak value (close to 0.5), and the dc-link voltage $v_{dc}$ stays at the average value $V_{dc}$. Another possible maximum volt-second point occurs when the dc-link voltage reaches the peak value $V_{dc}+|v_{ripple}|$. These two possible switching-frequency maximum points are shown below in (13) and (14), respectively. Notice that most of the switching-frequency $v_{CM}$ will be applied on the CM choke $L_{CM}$.

$$VS_{H1} = V_{CMC}t_{CM} \approx v_{CM}t_{CM} = \frac{1}{2}V_{dc}t_{CM\_max} \quad (13)$$

$$VS_{H2} = V_{CMC}t_{CM} \approx v_{CM}t_{CM} = \frac{1}{2}V_{dc\_max}t_{CM} \quad (14)$$

Further derivation shows that equations (13) and (14) can be reformed as equations (15) and (16), respectively, where M is the full-bridge modulation index (which is defined as the peak voltage of the AC grid divided by the DC link voltage $$VS_{H1} = \frac{1}{2}V_{dc}\frac{1}{2}T_s \quad (15)$$

$$VS_{H2} = \frac{1}{2}(V_{dc} + |v_{ripple}|)\frac{1}{2}\left(1 - \frac{M}{\sqrt{2}}\right)T_s \quad (16)$$

The maximum switching-frequency volt-second can be determined by the larger value provided by equations (15) or (16). In most cases, the volt-second in equation (15) is the maximum point.

$$VS_{max\_H} = VS_{H1} \quad (17)$$

The low-frequency (mainly 120 Hz) volt-second is due to the CM voltage generated by $d_{CM}$, and the corresponding volt-second is shown in (18).

$$VS_L = \int \frac{1}{2}v_{dc}d_{CM} \quad (18)$$

$V_{SL}$ in (18) reaches the peak value $VS_{Lmax}$ every half cycle (120 Hz). If $d_{CM}$ is expressed in (19), the generated maximum low-frequency volt-second $VS_{Lmax}$ is derived in (20).

$$d_{CM} = M_{CM}\sin(2\omega_o t), \omega_o = 2\pi 60 \text{ rad/s} \quad (19)$$

$$VS_{Lmax} = \frac{1}{2}V_{dc}\frac{M_{CM}}{\omega_o} \quad (20)$$

As such, the maximum low-frequency volt-second applied on the CM choke $L_{CM}$ is derived as:

$$VS_{max\_L} = \frac{(2\omega_o)^2 L_{CM} \cdot 2C_{DM\_s} \cdot VS_{Lmax}}{\sqrt{[1 - (2\omega_o)^2 L_{CM} \cdot 2C_{DM\_s}]^2 + (2\omega_o R_L \cdot 2C_{DM\_s})^2}} \quad (21)$$

If the resonant frequency of $L_{CM}$ and $2C_{DM\_s}$ is defined as $\omega_c$, equation (21) can be further simplified as shown in equation (22).

$$VS_{max\_L} \approx \frac{(2\omega_o)^2}{\omega_o^2 - (2\omega_o)^2}VS_{Lmax}, \omega_c = \frac{1}{\sqrt{L_{CM} \cdot 2C_{DM\_s}}} \quad (22)$$

The total maximum volt-second applied on $L_{CM}$ is shown in equation (23), which determines the design of $L_{CM}$. In order to avoid the saturation of $L_{CM}$, the number of turns $N_c$ and the core cross-sections $A_c$ have to fulfill the requirement in equation (24).

$$VS_{total\_max} = VS_{max\_L} + VS_{max\_H} \quad (23)$$

$$N_c \cdot A_c > \frac{VS_{total\_max}}{B_{max}} \quad (24)$$

As seen in equation (24), it determines the value of $N_c$ and $A_c$, thus determining the $L_{CM}$ value. A magnetic material with proper permeability has been chosen for the optimal design.

In order to freely tune the value of $L_{CM}$, an air-gap is designed and implemented. The design procedure of this CM choke $L_{CM}$ and $C_{DM\_s}$ capacitor are proposed simply as follows. First, design the core size and number of turns based on equation (22). Then, design the $L_{CM}$ value by designing the air-gap value. Finally, based on equation (6), design the $C_{DM\_s}$ to obtain the resonant frequency $\omega_c$ for a desired CM noise attenuation.

Figure 15:
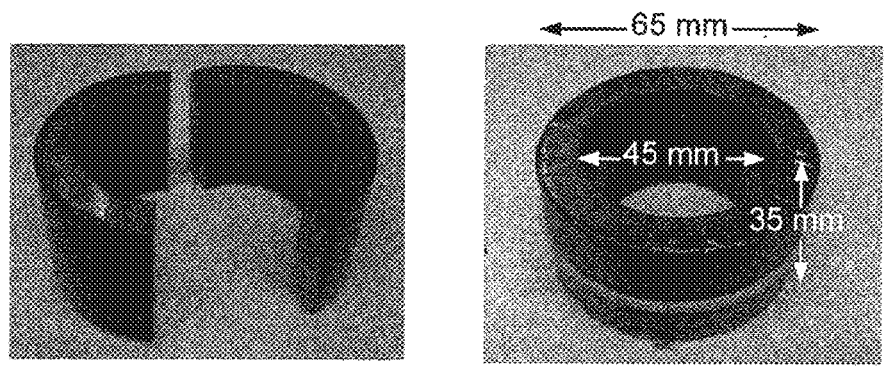
FIGS. 15, 16 and 17 are depictions of a preferred embodiment of an exemplary choke used in the modified filter in accordance with the invention and a graph of the impedance as a function of frequency of the choke.
Figure 16:
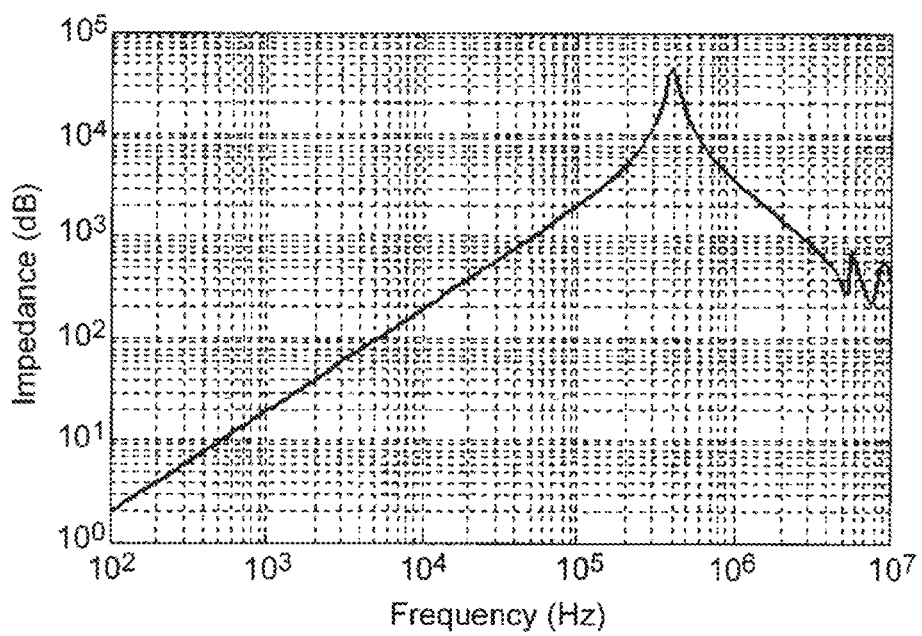
Figure 17:
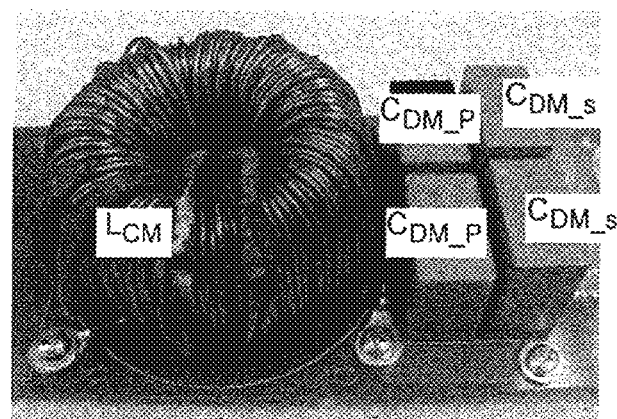

A nanocrystalline toroid core with air-gap is designed as shown in FIG. 15. The core is over-designed leaving 40% saturation margin. The air-gap is 0.1 mm and the number of turns is 25. As shown in FIG. 16, the measured CM inductance in the frequency range of interest is about 3.5 mH. The resonant frequency $\omega_c$ is chosen around 0.9 kHz, and the corresponding $C_{DM\_s}$ is 5.6 µF. $C_{DM\_P}$ is 6.6 µF ($C_{DM}$=10 µF). The preferred physical layout of $L_{CM}$, $C_{DM_P}$ and $C_{DM_s}$ is illustrated in FIG. 17.

In view of the foregoing, it is seen that the invention provides an entirely different approach to a solution to suppression of CM noise which is of increased effectiveness relative to known approaches that use additional switches for isolation during portions of the switching cycles and does so entirely with passive components having increased reliability. Low frequency CM noise is effectively suppressed using a feedback circuit to cause subtle modification of the control signal for pulse width modulating the full-bridge switches using, for example, special purpose digital processor to develop suitable transfer signals for the feedback loop. Leakage current to ground that is driven by the CM noise is virtually eliminated to avoid premature aging of DC components connected to the DC side of the converter. The effectiveness of the invention to suppress CM noise has been verified experimentally as illustrated in FIGS. 2D, 7, 11 and 12.

While the invention has been described in terms of a single preferred embodiment, those skilled in the art will recognize that the invention can be practiced with modification within the spirit and scope of the appended claims.

The invention claimed is:

1. A full-bridge single phase bidirectional AC/DC power converter having two phase legs on an AC side thereof and a capacitor connected between said two phase legs, said converter including
   a plurality of switches connected in a full bridge configuration,
   a choke comprising magnetically coupled windings connected in series in respective ones of said two phase legs,
   a split capacitor connected between said two phase legs and in parallel with said capacitor connected between said two phase legs, and
   a connection between a mid-point of said split capacitor and a mid-point of a split capacitor connected between DC voltage rails on a DC side of said power converter,
   wherein said switches in said full bridge configuration are driven by a pulse width modulated signal that is modified from sinusoidal modulation to provide active filtering of common mode voltage variation on said two phase legs by said full bridge configuration.

2. The power converter as recited in claim 1, wherein said connection includes a damping resistor.

3. The power converter as recited in claim 1, wherein said DC side of said power converter is connected to a photovoltaic cell.

4. The power converter as recited in claim 3, wherein said AC side of said power converter is connected to an AC power distribution grid.

5. The power converter as recited in claim 1, wherein said AC side of said power converter is connected to an AC power distribution grid.

6. The power converter as recited in claim 1, further comprising
   a source of a sinusoidal waveform modulation signal,
   a circuit responsive to common mode voltage variation on said two phase legs to modify said sinusoidal waveform modulation signal to provide a modified sinusoidal waveform modulation signal,
   a source of a triangular waveform modulation signal, said triangular waveform modulation signal having a frequency higher than a frequency of said sinusoidal modulation signal, and
   a comparator to compare amplitudes of said modified sinusoidal waveform modulation signal and said triangular waveform modulation signal, wherein said comparator controls said plurality of switches connected in said full bridges configuration.

7. The power converter as recited in claim 6, further including an L-C-L filter in said AC side of said power converter.

8. The power converter as recited in claim 6, wherein said connection includes a damping resistor.

9. The power converter as recited in claim 6, wherein said DC side of said power converter is connected to a photovoltaic cell.

10. The power converter as recited in claim 9, wherein said AC side of said power converter is connected to an AC power distribution grid.

11. The power converter as recited in claim 6, wherein said AC side of said power converter is connected to an AC power distribution grid.

12. The power converter as recited in claim 1, further comprising
   a feedback path to combine at least two signals, each corresponding to a voltage on said DC side of said converter due to said common mode voltage variation in said two phase legs, to provide said modification of said sinusoidal modulation signal.

13. The power converter as recited in claim 1, further comprising
   a feedback path including an adder to combine two signals corresponding to a voltage on said DC side of said converter due to said common mode voltage variation on said two phase legs in accordance with different transfer functions to provide a combined signal and a further adder to provide said modification of said sinusoidal modulation signal.

14. A method of reducing common mode noise and leakage current through parasitic capacitance in a single phase, full bridge power converter having unipolar modulation of switches and having two phase legs on an AC side of said power converter and a capacitor connected between said two phase legs, said method comprising steps of
   magnetically coupling said two phase legs opposingly,
   connecting a split capacitor across said two phase legs in parallel with said capacitor connected between said two phase legs to form a mid-point on said AC side of said converter,
   connecting a split capacitor across a DC side of said power converter to form a mid-point on said DC side of said power converter, and
   connecting said mid-point of said split capacitor on said AC side of said power converter to said mid-point of said split capacitor on said DC side of said power converter
   wherein said switches in said full bridge configuration are driven by a pulse width modulated signal that is modified from sinusoidal modulation to provide active filtering of common mode voltage variation on said two phase legs by said full bridge configuration.

15. The method as recited in claim 14 further comprising a step of
   modifying said unipolar modulation from a sinusoidal pulse width modulation in accordance with low frequency common mode noise appearing on said DC side of said power converter.

16. The method as recited in claim 15, wherein said modifying step is performed using a feedback arrangement operating as an active filter.

17. The method as recited in claim 14, including the further step of
   designing a device for performing said magnetic coupling to avoid saturation at maximum volt-second points of said unipolar modulation.

* * * * *